US006226594B1

(12) United States Patent
Nakamura

(10) Patent No.: US 6,226,594 B1
(45) Date of Patent: May 1, 2001

(54) ELECTRONIC TIDE METER, SPRING TIDE DAY CALCULATING METHOD, AND RECORDING MEDIUM FOR THE SAME

(75) Inventor: Chiaki Nakamura, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/328,140

(22) Filed: Jun. 8, 1999

(30) Foreign Application Priority Data

Jun. 9, 1998 (JP) ........................................ 10-161178

(51) Int. Cl.[7] ........................................ G06F 19/00
(52) U.S. Cl. ........................................ 702/5
(58) Field of Search .................. 702/2, 3, 5; 368/19, 368/16, 17, 18

(56) References Cited

U.S. PATENT DOCUMENTS 5,115,417 5/1992 Saunders ........................ 368/19
5,293,355 * 3/1994 Widen et al. ................... 369/19
5,299,126 * 3/1994 Spraker ........................ 368/18
5,347,497 * 9/1994 Allen ........................... 368/19
5,363,307 * 11/1994 Yoshida ....................... 364/452
5,475,655 * 12/1995 Kerr ............................ 368/19
5,574,465 * 11/1996 Okada .......................... 342/352
5,579,289 * 11/1996 Kerr ............................ 368/19
5,731,573 * 3/1998 Allen et al. .................. 235/78 R

FOREIGN PATENT DOCUMENTS 3019279 11/1981 (DE) .
62-54356 3/1987 (JP) .
WO9707436 2/1997 (WO) .

* cited by examiner

*Primary Examiner*—Donald E. McElheny, Jr.
(74) *Attorney, Agent, or Firm*—Adams & Wilks

(57) ABSTRACT

A tide meter for calculating a spring tide day. First, a moon age value is determined depending on a designated calendar. The moon age value includes at least one of the day of the new moon and the day of the full moon. Tidal data is stored that is specific for each geographic location, and this data is used in calculating the spring tide day for a selected geographic area. Since the time of the rising and falling of the tide depends on geographic location, simply calculating a spring tide day from the position of the moon and sun may not be accurate for a specific geographic location. Accordingly, the stored tidal data that corresponds to a selected geographic area is included in the spring tide day calculation. Thus, the accuracy of the spring tide day calculation is increased for the particular selected geographic area.

12 Claims, 5 Drawing Sheets

ELECTRONIC TIDE METER, SPRING TIDE DAY CALCULATING METHOD, AND RECORDING MEDIUM FOR THE SAME

BACKGROUND OF THE INVENTION

1. Field of the Invention

The present invention relates to an electronic tide meter for calculating a spring tide day and displaying the calculated result, a spring tide day calculating method, and a recording medium which can be read by a computer recorded execute the method.

2. Description of the prior Art

The tides or the rising and falling of the sea level are of particular importance to fishermen. Above all, the spring tide day is the most important.

It is generally achieved by calculating the age or phase of the moon to acquire the tidal phenomena, especially the spring tide day. The calculated result of the moon age is available as the tidal information by the public agencies so that the spring tide day can be acquired by perusing the tidal information.

For those who always require the Information of the tidal phenomena, however, the perusal of the information is inefficient, and all the opened information on the tidal phenomena is not always required. Thus, there has been desired means for knowing the information of the desired tidal phenomena, especially the spring tide day.

Therefore, there has been proposed an electronic tide meter for displaying the calculated result of the spring tide day by deducing the moon age from a desired data (as will be called the "designated date") and by calculating the spring tide day to appear at first from the designated date, by using the deduced moon age.

According to the electronic tide meter disclosed in JP-B-6-25982, for example, the spring tide day is determined by calculating the moon age on the designated date at first and by calculating the number of days till the next spring tide appears, from the moon age while considering the period of the moon age.

Generally, the spring tide and the neap tide are individually defined as the states of tide at the full moon or the new moon and as the states of tide at the first and last quarters of the moon. However, the day deemed important for those in the fishing industry, is the day on which the tide level difference is at its maximum between the high and low tides in each particular geographical area. The spring tide day does not always coincide in this sense with the aforementioned one which is calculated depending exclusively on the moon age. This is because the tide level difference between the high and low tides is different depending on the geographical area, so that the spring tide day depending upon the area cannot be calculated exclusively from the moon age deduced from the calculation of the positions of the heavenly bodies.

In the electronic tide meter disclosed in JP-B-6-25982, the calculation is made by using only the moon age at the designated date. Even when the day actually having the maximum tide level difference is two days after the data calculated for a particular geographical area, there may occur such a large error that the actual spring tide day comes five days after the designated calculated date.

The invention has been conceived in view of those disadvantages belonging to the prior art and has an object to provide an electronic tide meter and a spring tide day calculating method for calculating a spring tide day corresponding to an area more accurately, and a recording medium which can be read by a computer stored with a program for causing the computer to execute the inventive calculating method.

SUMMARY OF THE INVENTION

In order to achieve the object by solving the aforementioned problems, according to a first construction of the invention, there is provided an electronic tide meter for calculating a spring tide day from a designated calendar, which meter comprises: input means for inputting the calendar and selecting a geographical area; storage means for storing the tidal data of each area; and operation means for calculating the positions of the heavenly bodies from the calendar and reading the tidal data, as determined by the selection of the area, from the storage means to calculate the spring tide day from the calculated result of the positions of the heavenly bodies and the tidal data.

According to this construction, there is provided the operation means for calculating the spring tide day by using not only the moon age value such as the positional information of the heavenly bodies, as determined from the designated calendar, but also the tidal data which is dependent on a selected geopraphic area and stored in area the storage means. Thus, the spring tide day for the selected grographical area can be accurately determined.

According to a second construction of the invention, on the other hand, there is provided an electronic tide meter for calculating a spring tide day from a designated calendar. The tide meter comprises: input means for inputting the calendar and selecting a geographic area area; storage means for storing the tidal data of each area; new moon day and full moon day calculating means for determining a new moon day and a full moon day by calculating the positions of the heavenly bodies from the calendar; and spring tide day operation means for reading the tidal data, as determined by the selection of the area, from the storage means to calculate the to spring tide day by adding the tidal data individually to the new moon day and the full moon day the spring tide day is calculated.

According to this construction, there is provided the spring tide day operating means for calculating the true spring tide day, by determining the moon age value such as the positional information of the heavenly bodies from the designated calendar. The tidal data of each area, tidal phenomena, from the storage means provided, and by adding the tidal data to the new moon day and the full moon day, as determined from the moon age value, to determine a tentative spring tide day.

According to a third construction of the invention, on the other hand, there is provided a spring tide day calculating method for calculating a spring tide day from a designated calendar. The inventive method comprises: a first step of storing tidal data of each area; a second step of inputting the calendar and selecting the area; a third step of calculating the positions of the heavenly bodies from the calendar; and a fourth step of calculating the spring tide day from the calculated results of the positions of the heavenly bodies and the tidal data corresponding to the selected area.

According to this construction, the spring tide day is calculated by using not only the moon age value such as the positional information of the heavenly bodies, as determined from the designated calendar, but also the tidal data which are difference for each geographic area and stored in the storage means. Thus, the spring tide day of different geographic areas can be accurately determined.

According to a fourth construction of the invention, on the other hand, there is provided a spring tide day calculating method for calculating a spring tide day from a designated calendar. The inventive method comprises: a first step of storing tidal data of each geographic area; a second step of inputting the calendar and selecting the area; a third step of calculating the positions of the heavenly bodies from the calendar to determine the new moon day and the fully moon day from the calculated results of the positions of the heavenly bodies; and a fourth step of calculating the day, as appearing at first on and after the calendar, of those determined by adding the tidal data, as determined by the selection of the area, individually to the new moon day and the full moon day, as the spring tide day.

According to this construction of the invention, on the other hand, the true spring tide day is calculated by determining the moon age value such as the positional information of the heavenly bodies from the designated calendar, by reading the tidal data of each area, as causing the tidal phenomena, and by adding the tidal data to the new moon day and the full moon day, as determined from the moon age value, to determine a tentative spring tide day, when this tentative spring tide day is the first day to appear on and after that calendar, so that the spring tide day different between the areas can be accurately determined.

According to a fifth construction of the invention, on the other hand, there is provided a recording medium which can be read from a computer stored with a program for causing the computer to execute a spring tide day calculating method for calculating a spring tide day from a designated calendar. The program comprises: a first procedure for storing tidal data of each area; a second procedure for selecting the area; a third procedure for calculating the positions of the heavenly bodies from the calendar; and a fourth procedure for calculating the spring tide day from the calculated results of the positions of the heavenly bodies and the tidal data corresponding to the selected area.

According to this construction, the spring tide day is calculated by using not only the moon age value such as the positional information of the heavenly bodies, as determined from the designated calendar, but also the tidal data which are difference for each area designated by the storage means provided, so that it is possible to provide the program capable of accurately determining the spring tide day different between the areas.

According to a sixth construction of the invention, on the other hand, there is provided a recording medium which can be read from a computer stored with a program for causing the computer to execute a spring tide day calculating method for calculating a spring tide day from a designated calendar. The program comprises: a first procedure for storing tidal data of each area, as causing tidal phenomena; a second procedure for inputting the calendar and selecting the area; a third procedure for calculating the positions of the heavenly bodies from the calendar to determine a new moon day and a full moon day from the calculated results of the positions of the heavenly bodies; and a fourth procedure for calculating the day, as appearing at first on and after the calendar, of those determined by adding the tidal data, as determined by the selection of the area, individually to the new moon day and the full moon day, as the spring tide day.

According to this construction of the invention, the true spring tide day is calculated by determining the moon age value such as the positional information of the heavenly bodies from the designated calendar, by reading the tidal data of each area, as causing the tidal phenomena, and by adding the tidal data to the new moon day and the full moon day, as determined from the moon age value, to determine a tentative spring tide day, when this tentative spring tide day is the first day to appear on and after that calendar, so that it is possible to provide the program capable of accurately determining the spring tide day different between the areas.

BRIEF DESCRIPTION OF THE DRAWINGS

A preferred form of the present Invention is illustrated in the accompanying drawings in which.

DETAILED DESCRIPTION OF THE PREFERRED EMBODIMENTS

An embodiment of an electronic tide meter according to the invention will be described in detail with reference to the accompanying drawings. Here, the invention should not be limited by this embodiment. Here in the description of this embodiment, the day, on which the level difference in each area between the spring and neap tides takes the maximum, will be defined as the "spring tide day".

Figure 1:
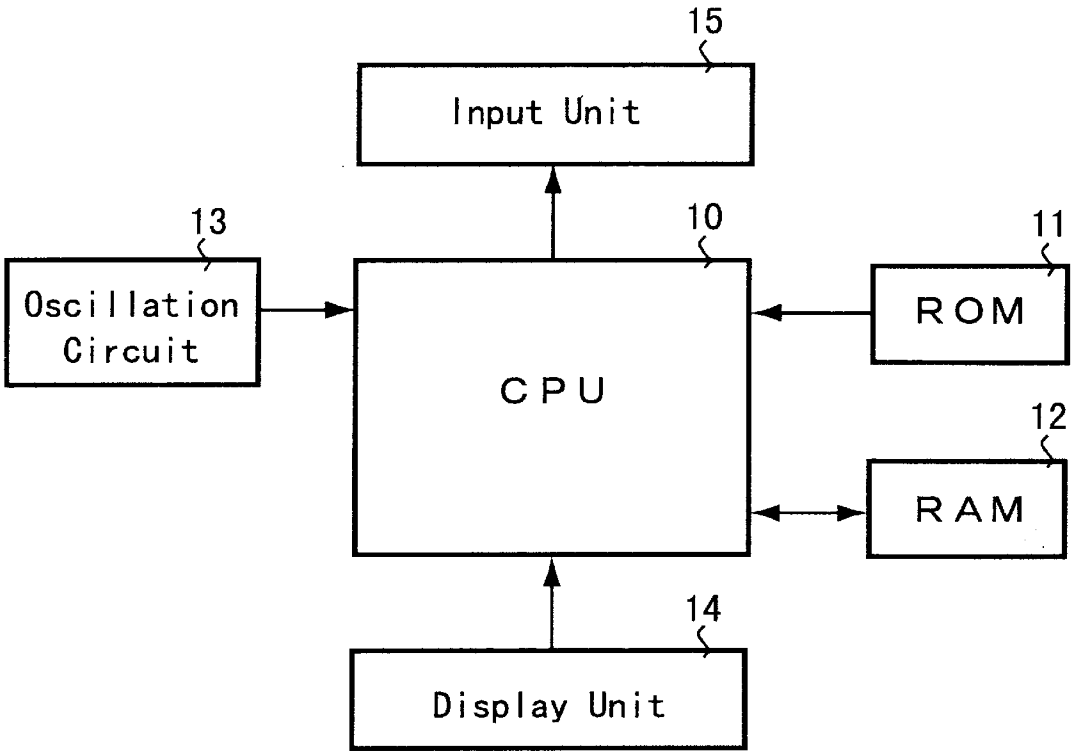
FIG. 1 is a block diagram of an electronic tide meter according to an embodiment.

FIG. 1 is a block diagram of the electronic tide meter according to the invention. In FIG. 1, the electronic tide meter is constructed to include: an input unit 14 capable of inputting a calendar, a selected area and so on from a user; a central processing unit (CPU) 10 for calculating the spring tide day in accordance with a demand from the user through the input unit 14; an oscillation circuit 13 for generating a clock to drive the CPU 10; a ROM 11 stored with an operation program or the like of the CPU 10; a RAM 12 for latching the operated result calculated by the CPU 10, the set state of the user and so on; and a display unit 15 for displaying the operated result, as calculated by the CPU 10, and so on. The ROM 11 also stores the later-described tidal data of each area.

Figure 2:
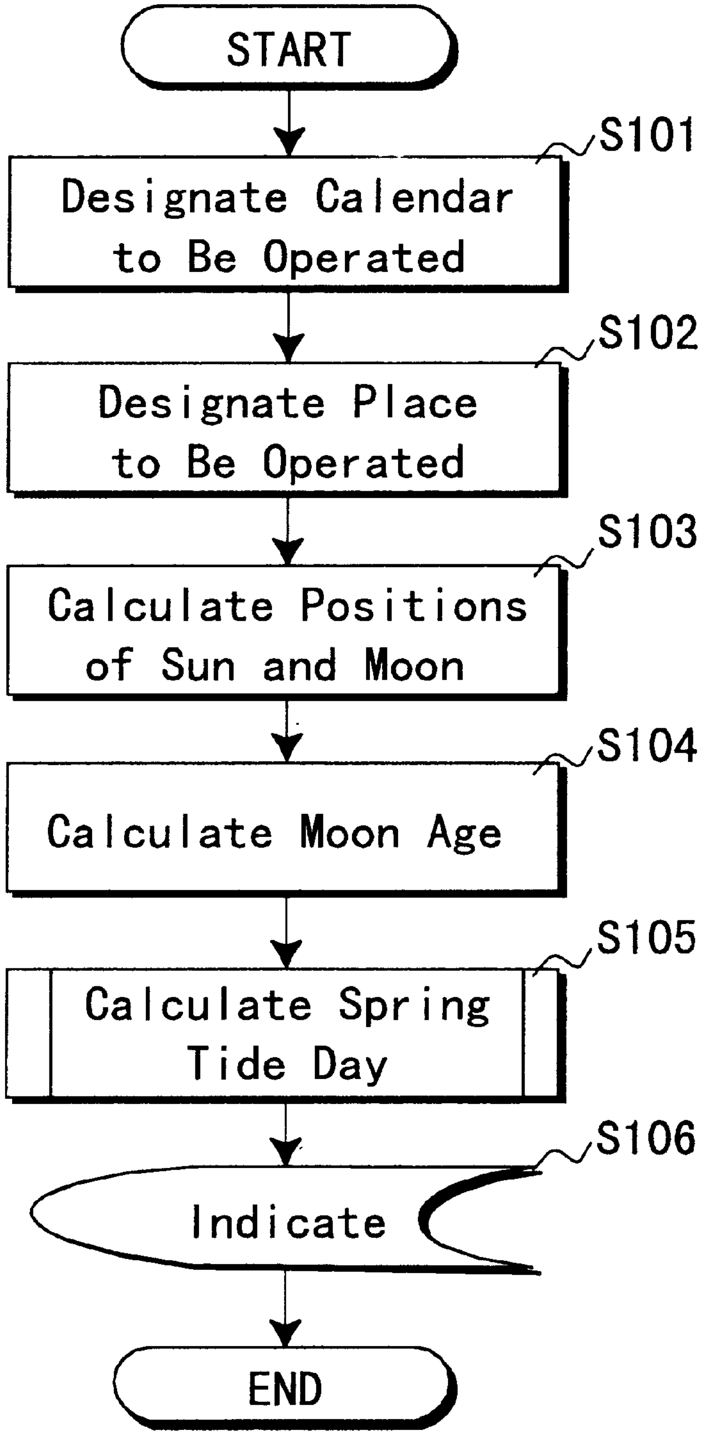
FIG. 2 is a flow chart showing the operations of the electronic tide meter according to the embodiment.

Next, the operations of the electronic tide meter according to the invention will be described with reference to a flow chart shown in FIG. 2. First of all, the user inputs a spring tide day calculation starting date (as will be called the "designated date) for informing the first spring tide day through the input unit 14. Specifically, a calendar to be operated is designated (at Step S101).

Next, the user selects the area, the spring tide day of which is desired, through the input unit 14 from an area list stored in the ROM. Specifically, the plate (as will be called the "designated area") to be operated is designated (at Step S102). As a result, the tidal data intrinsic to the designated place are selected as the value to be used in the later-described operations, from the ROM 11.

Subsequently, the positions of the heavenly bodies are calculated from the designated date inputted at Step S101, to determine the moon age value. For this moon age determination, it is necessary to calculate the celestial longitudes of the moon and the sun on the designated date. In short, the positions of the sun and the moon have to be calculated (at Step S103). At Step S103, the number of elapsed days (i.e., the number of days elapsed to the designated date) TD from Jan. 1, 2000 to the designated date (–month, –date, –year) is calculated at first from:

$$TD=\{(int[365,2425*\text{year}]+int[3.59*(\text{month}-2)]+\text{day}-678912)+2400000.5\}-2451545.$$

Here, the elapsed day number TD expresses the number of days elapsed from the Julian day, and the int[ ] in the aforementioned Formula is a function for omitting the fractions so that if the month value indicates the first or second month, it is calculated as the thirteenth or fourteenth month of the preceding year (i.e., year–1).

Next, the value Td12 (i.e., the number of elapsed days at noon of the designated date) Td12 indicating the time factor of the noon of the designated date is calculated by using the designated date elapsed day number TD from:

$$Td12=TD-(12-dt)/24.$$

Here, the dt designates the time difference at the designated area from the world time and is exemplified by dt=+9 in Japan. Moreover, a time factor T expressing the elapsed day number Td12 of the designated date noon in the Julian century number (36525) is calculated from:

$$T=Td12/36525.$$

By using this time factor T, the visual celestial longitude of the moon and the visual celestial longitude of the sun can be calculated.

First of all, the visual celestial longitude LM of the moon is calculated from:

$$GO=481267.8809*T+218.3162+6.2888*COS\{(477198.868*T+44.963)*DR\}+1.2740*COS\{(413335.35*T+10.74)*DR\}+$$

$$0.6583*COS\{(890634.22*T+145.7)*DR\}+0.2136*COS\{(954397.74*T+179.93)*DR\}+0.1851*COS\{(35999.05*T+87.53)*DR\};$$

$$DR=3.141593/180;$$

and $$LM=GO-(int[GO/360]*360).$$

Next, the visual celestial longitude of the sun is calculated from:

$$G=36000.7695*T+280.4695+1.9147*COS\{(35999.05*T+267.52)*DR\};$$

$$DR=3.141593/180;$$

and $$LS=G-(int[G/360]*360).$$

After the calculations of the positions of the sun and the moon thus far described at Step S103, the age of the moon is calculated (at Step S104). Finally at the Step S104, the moon age Age is calculated by using the aforementioned visual celestial longitudes LM and LS of the moon and the sun from:

$$X=LM-LS;$$

and $$\text{Age}=29.5305*X/360.$$

Here, the value X is reset, when it indicates a value less than 0, with a sum of itself and 360.

Subsequently, the true spring tide day is determined by using the moon age value thus calculated and the tidal data of each area, as stored in the ROM 11. First of all, however, here will be described the tidal data.

Usually, the tidal information is individually available for each major coastal areas such as harbors or beaches by public agencies. This tidal information includes the amplitudes or delay angles of the fundamental waves which are determined by identifying (or harmonically decomposing) the Fourier series, as expressed by the superpositions of the fundamental waves, from the graph of the tide level change metered by using the tide meter in the area or coastal area. The aforementioned Fourier series are especially called the "tide level estimating formula", and the fundamental waves are individually called the "tidal components" having the amplitudes or delay angles, as called the "harmonic constant".

The tidal phenomena are caused mainly by the tide generating force which is given from the heavenly bodies such as the moon and the sun, as well known in the art. Since the tidal phenomena are influenced by the terrain of the coastal area or the temperature of the sea water, however, the tidal information intrinsic to each area, i.e., the harmonic constant is essential. Since the positions of the heavenly bodies such as the moon or the sun are calculated by the calendar composed of the year, month and day, on the other hand, the aforementioned tide level estimating formula is finally completed by the calendar and the harmonic constant intrinsic to the area and is expressed as a time function for determining the tide level of the area to be acquired.

Here, the aforementioned tidal components express the waves which are generated by the tide generating force coming from each of the heavenly bodies. Of these numerous tidal components, those exerting serious influences upon the tidal phenomena are enumerated by an M2 tidal component (or a wave generated by the force of the moon and having a period of about one half day) and an S2 tidal component (or a wave generated by the force of the sun and having a period of one half day). For each tidal component, there are determined an angular velocity $\sigma_i$, and a delay angle $\kappa_i$, of which the delay angle $\kappa_i$ further indicates a value intrinsic to the area. Here, the suffix "i" indicates the kind of the tidal component. Therefore, these angular velocity $\sigma_i$ and the delay angle $\kappa_i$ are generally published for using the tide level estimating formula and are contained in the tidal data determined for each area.

By using these angular velocity $\sigma_i$ and delay angle $\kappa_i$, there is calculated a constant AG intrinsic to the area. Here are especially noted the aforementioned M2 tidal component and S2 tidal component. Generally, the M2 tidal component and the S2 tidal component have angular velocities expressed by $\sigma_{M2}=28.9841042$ and $\sigma_{S2}=30$, respectively. In other words, the M2 tidal component and the S2 tidal component are advanced by 28.9841042 degrees and 30 degrees, respectively, for one hour. Therefore, the M2 tidal component and the S2 tidal component have a phase difference of about 1.02 degrees for one hour. Even in the state where the imaginary heavenly bodies of M2 and S2 just superpose each other, on the other hand, the two tidal components are out of phase of $\kappa_{S2}$ and $\kappa_{M2}$. Here will be defined a constant expressing the instant when those two tidal components come into phase so that their synthesized waves have the maximum amplitude, in terms of the unit of day.

If this constant is designated by AG, the phase difference for one day between the M2 tidal component and the S2 tidal component is 1.02×24=about 24.5 degrees. Therefore, the constant AG is calculated by using the delay angle $\kappa_{M2}$ of the M2 tidal component and the delay angle $\kappa_{S2}$ from:

$$AG=(\kappa_{S2}-\kappa_{M2})/24.5.$$

This constant AG is different for every areas and is stored as a portion of the tidal data in the ROM 11. If not this constant AG but the aforementioned angular velocity $\sigma_i$ and delay angle $\kappa_i$ are stored as the tidal data in the ROM 11, on the other hand, the constant AG for each area may be determined by using those angular velocity $\sigma_i$ and delay angle $\kappa_i$.

At Step S101 to Step S104 thus far described, therefore, the moon age value is calculated at the designated date and to determine the constant AG in the designated area. Subsequently, these moon age value and the constant AG are used to calculate the true spring tide day (at Step S105).

Since the constant AG indicates the day number at which the synthesized wave of the two tidal components takes the maximum, the true spring tide day can be determined by adding the constant AG from either the lunar first day (on which the visual celestial longitudes of the sun and the moon are identical) or the full moon day (on which the difference between the visual celestial longitudes of the sun and the moon is 180 degrees), as determined front the moon age value. Here, the first spring tide day is determined from the designated date, and four positional relations A, B, C and D can be thought on the designated date and the spring tide day, as shown in FIG. 3.

Figure 3:
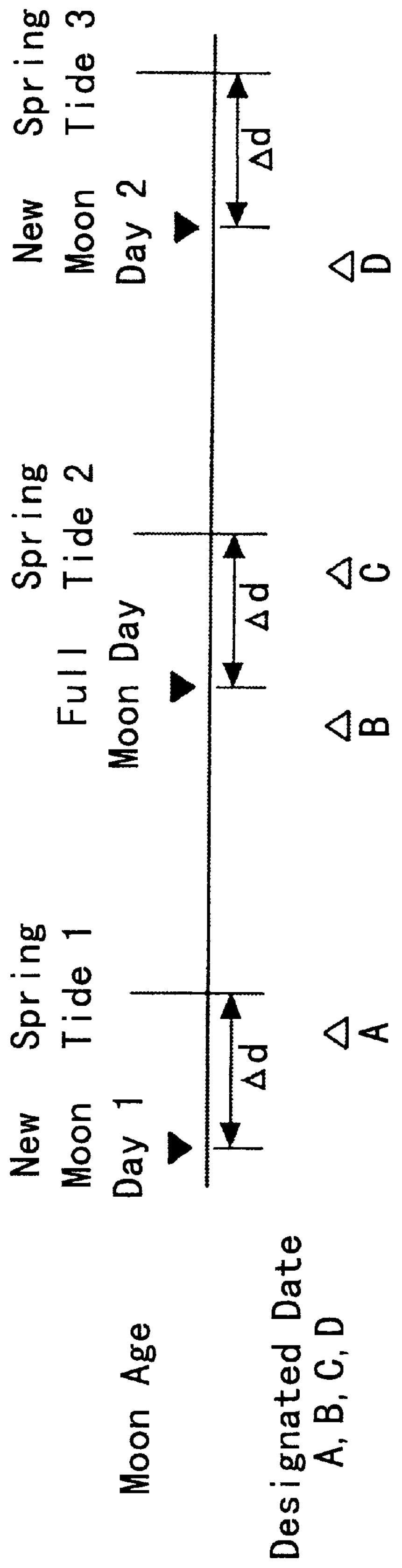
FIG. 3 is a diagram for explaining the calculation of a spring tide day according to the embodiment.

In FIG. 3, letters Δd indicates the constant AG, and the days, as elapsed by the Δd from the new moon day 1, the full moon day and the new moon day 2, are designated by the spring tide 1, the spring tide 2 and the spring tide 3, respectively. The calculation of the spring tide day of the case, in which the designated date A is designated for the time period between the new moon day 1 and the spring tide 1, for example, on the time axis, is achieved by adding the constant AG to the number (as will be called the "new moon day 1 value") of days elapsed from the Julian day of the new moon day 1. Here, the new moon day 1 value is calculated by using the elapsed day number Td12 of the designated date noon, as calculated at Step S103, and the lunar age Age of the designated date, as calculated at Step S104, from:

New moon Day 1 Value=Elapsed Day Number *Td*12 of Designated Date Noon−Moon Age Value Age of Designated Date.

Here, the value, as expressed by the calculation of the new moon day 1 value+the constant AG, indicates the data at which the spring tide occurs as the number (as will be called the "spring tide day value") of days elapsed from the Julian day. This value is further transformed into the calendar so that the date, at which the spring tide 1 occurs, is used as the true spring tide day.

Next, the calculation of the spring tide day will be described in the case in which the designated date B is designated for a time period between the spring tide 1 and the fully moon day is obtained by adding the constant AG to the number (as will be called the "full moon value") of days elapsed from the Julian day of the full moon. Here, the full moon value is calculated by determining the new moon day 1 value, as described on the case of the designated date A, and by adding 14.77 simply to the new moon day 1 value. Here, the value, as expressed by the addition of the full moon value plus the constant AG, is also the spring tide day value, and this value is further transformed into the calendar so that the date, at which the spring tide 2 occurs, is used as the true spring tide day.

Moreover, the calculation of the spring tide day in the case in which the designated date C is designated for the time period between the full moon day and the spring tide 2, is obtained by adding the constant to the full moon value, as described on the case of the designated date B, because the spring tide 2 has to be the true spring tide day. Here, the value, as expressed by the operation of the full moon value+the constant AG, is also the spring tide day value, and this value is further transformed into the calendar so that the date, at which the spring tide 2 occurs, is used as the true spring tide day.

Next, the calculation of the spring tide day of the case, in which the designated date D is designated for a time period between the spring tide 2 and the new moon day 2, is achieved by adding the constant AG to the number (as will be called the "new moon day 2 value") of days elapsed from the Julian day of the new moon day 2. Here, first of all, the data, as made by adding 20 days to the designated date, is newly used as the designated date to determine the number of elapsed days of the noon from the Julian day (i.e., the number of elapsed days of the noon after 20 days of the designated date) and the lunar age value Age after 20 days of the designated date. Moreover, the new moon day 2 value is calculated by using the number of elapsed days of the noon after 20 days of the designated date and the lunar age value Age after 20 days of the designated date, from:

New moon Day 2 Value =
Number of Elapsed Days of Noon after 20 Days of Designated Date −
Lunar Age Value Age after 20 Days of Designated Date.

Here, the value, as expressed by the operation of the new moon day 2 value+the constant AG, is the spring tide day value, and this value is further transformed into the calendar so that the date, at which the spring tide 3 occurs, is used as the true spring tide day.

In the cases of the designated dates A, B, C and D thus far described, the calculation of the true spring tide day from the individually calculated spring tide day values is achieved by determining the number of days elapsed from the designated date, from the condition that the determined spring tide day value is larger than the number of elapsed days of the designated date, i.e., that the spring tide day to be determined never fails to be on or after the designated date. No time information is required so that only the integers may be calculated. Therefore, the spring tide day is calculated from:

Spring Tide Day = Designated Date +
(Spring Tide Day Value −
Number of Elapsed Days of
Designated Date).

Figure 4:
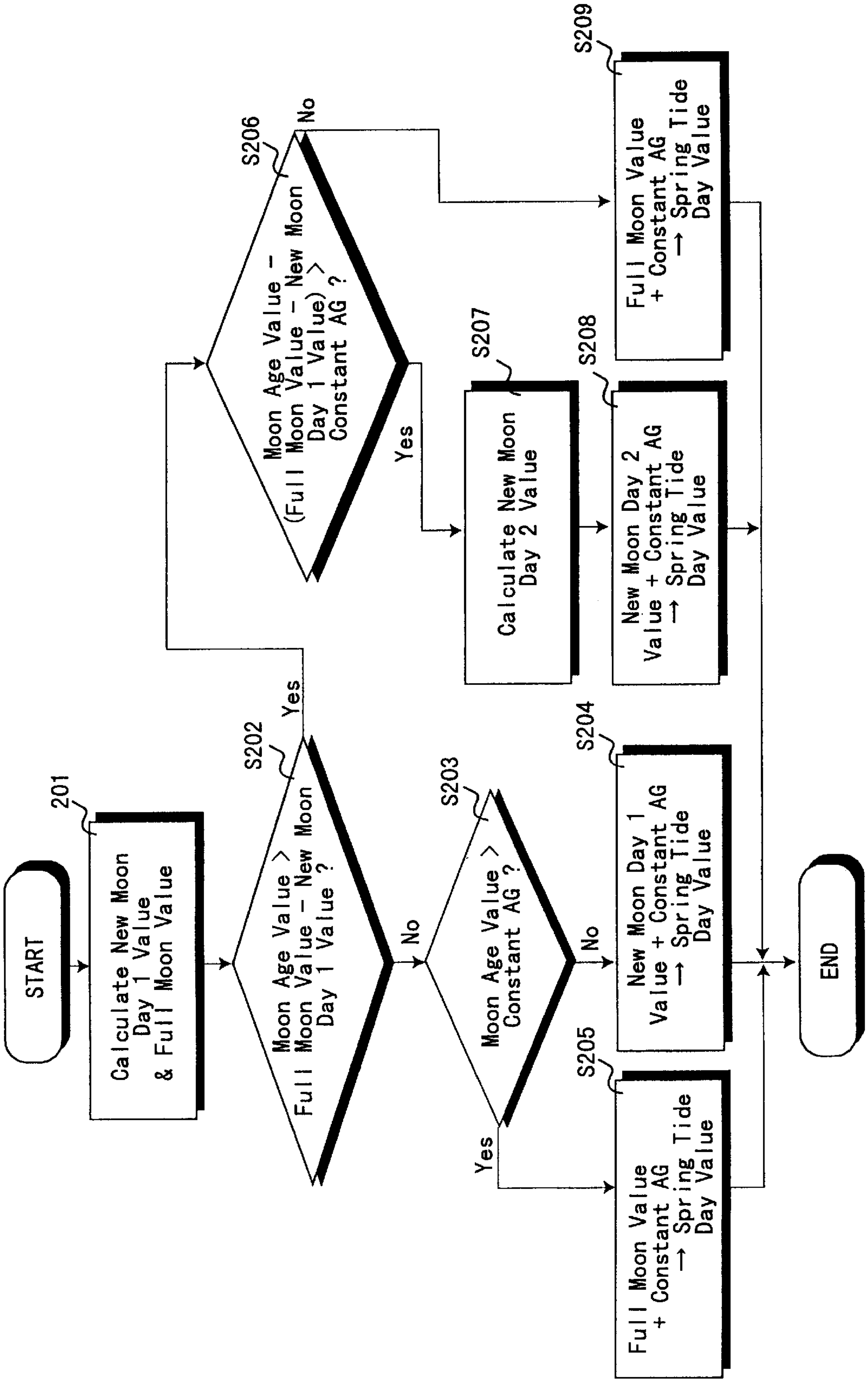
FIG. 4 is a flow chart for explaining the spring tide day operation according to the embodiment.

The spring tide day operation of the foregoing Step S105 will be described in more detail with reference to the flow chart shown in FIG. 4. In FIG. 4, the aforementioned new moon day 1 value and the full moon value are calculated (at Step S201) at first by using the lunar age value at the designated date, as calculated at Step S104 of FIG. 2.

Next, it is decided (at Step S202) which of the moon age value or the difference between the full moon value and the new moon day 1 value, i.e., (the full moon value−the new moon day 1 value) is larger. When it is decided at Step S202 that the value of (the full moon value−the new moon day 1 value) is larger than the moon age value, i.e., that the designated date corresponds on the aforementioned designated date A or B, it is decided (at Step S203) which of the moon age value and the constant AG is larger. When it is decided at Step S203 that the constant AG is larger than the moon age value, i.e., that the designated date corresponds to the aforementioned designated date A, the sum of the new moon day 1 value and the constant AG is the spring tide day value (at Step S204).

When it is decided at Step S203 that the constant AG is smaller than the moon age value, i.e., that the designated date corresponds to the aforementionod designated date D, the sum of the full moon value and the constant AG is the spring tide day value (at Step S205).

When it is decided at Step S202 that the value of (the full moon value−the new moon day 1 value) is smaller than the moon age value, i.e., that the designated date corresponds to the aforementioned designated date C or D, the difference is decided (at Step S206) between the moon age value and the result of the full moon value minus the new moon day 1 value, i.e., the value {the moon age value−(the full moon value−the new moon day 1 value)} or the constant AG. When it is decided at Step S206 that the constant AG is smaller than the value of {the moon age value−(the full moon value−the new moon day 1 value)}, i.e., that the designated date corresponds to the aforementioned designated date C, the sum of the full moon value and the constant AG is the spring tide day value (at Step S209).

When it is decided at Step S206 that the constant AG is larger than the value {the moon age value−(the full moon value−the new moon day 1 value)}, i.e., that the designated date corresponds to the aforementioned designated date D, the aforementioned new moon day 2 value is calculated (at Step S207). Subsequently, the sum of the new moon day 2 value and the constant AG is the spring tide day value (at Step S208), After the spring tide day values were determined at the foregoing Step S204, Step S205, Step S208 and Step S209, the actual date is calculated by using the aforementioned Formula of the spring tide day=the designated date+(the spring tide day value−the number of elapsed days of the designated date), thus ending the operation of Step S105 of FIG. 2.

After the end of Step S105, the spring tide day obtained at Step S104 is displayed on the display unit 15 (at Step S106).

Figure 5:
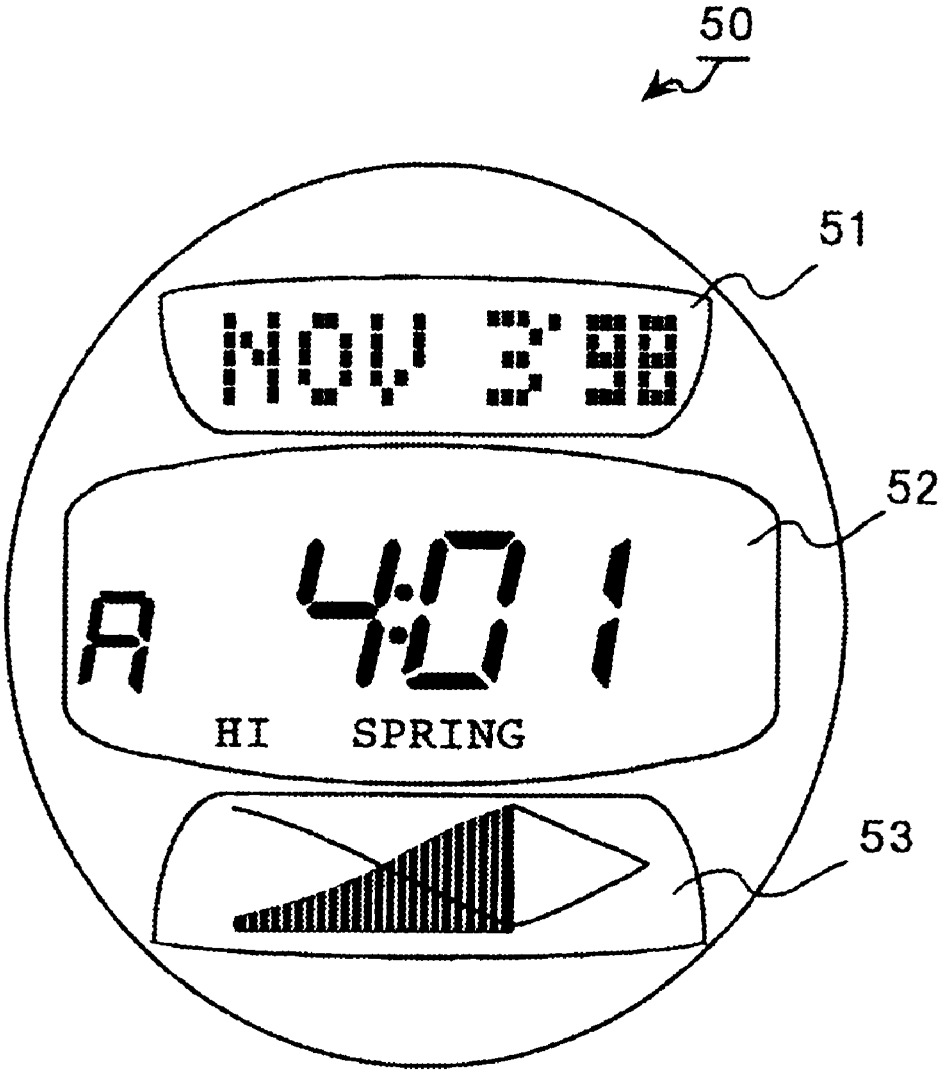
FIG. 5 is a diagram showing an example of the display of the spring tide day of the electronic tide meter according to the embodiment.

FIG. 5 shows an example in which the high spring day is displayed in a display device 50 corresponding to the display unit 15. In FIG. 5, a display region 51 is a region for displaying the date indicating the spring tide day. A display region 52 is a region for displaying the time of low or high tide time on the spring tide day together with a mark indicating the spring tide day. On the other hand, the display region 51 and the display region 52 are a display region for an input confirmation of a designated date by the user, and a display region for selecting the designated area. Moreover, a display region 53 displays a tidal graph indicating the low or high tide.

In order to determine the spring tide day, according to the electronic tide meter thus far described, an accurate spring tide day intrinsic to a designated area can be determined by storing the tidal data different for each area in the ROM 11, by calculating the moon age value on the designated date in the CPU 10, by reading the tidal data in the designated area from the ROM 11, and by adding the tidal data from the new moon day or the full moon day, as determined from the moon age value. Here, it is needless to say that the neap day intrinsic to the designated area can be calculated by adding the days of the first or last quarter of the moon, as determined from the moon age value, and the tidal data. On the other hand, the neap tide day may be determined from the interval of the spring tide days thus determined.

On the other hand, the spring tide day calculating method thus far described in the embodiment is stored as the computer program in a recording medium such as a magnetic disk or an optical disk so that the spring tide day can be calculated by reading that program.

According to the first construction of the invention, there is provided the operation means for calculating the spring tide day and the low spring tide day by using not only the moon age value, as determined from the designated calendar, but also the tidal data which are different for each area designated by the storage means provided, so that the different spring tide day between the areas can be accurately determined.

According to the second construction of the invention, on the other hand, there is provided the spring tide day operating means for calculating the true spring tide day, by determining the moon age value from the designated calendar, by reading the tidal data of each area, as causing the tidal phenomena, from the storage means provided, and by adding the tidal data to the new moon day and the full moon day, as determined from the moon age value, to determine a tentative spring tide day, when this tentative spring tide day is the first day to appear on and after that calendar.

According to the third construction of the invention, on the other hand, the spring tide day is calculated by using not only the moon age value, as determined from the designated calendar, but also the tidal data which are difference for each area designated by the storage means provided, so that the spring tide day different between the areas can be accurately determined.

According to the fourth construction of the invention, on the other hand, the true spring tide day is calculated by determining the moon age value from the designated calendar, by reading the tidal data of each area, as causing the tidal phenomena, and by adding the tidal data to the new moon day and the full moon day, as determined from the moon age value, to determine a tentative spring tide day, when this tentative spring tide day is the first day to appear on and after that calendar, so that the spring tide day different between the areas can be accurately determined.

According to the fifth construction of the invention, the spring tide day is calculated by using not only the moon age value, as determined from the designated calendar, but also the tidal data which are difference for each area designated by the storage means provided, so that it is possible to provide the program capable of accurately determining the spring tide day different between the areas.

According to the sixth construction of the invention, on the other hand, the true spring tide day is calculated by determining the moon age value from the designated calendar, by reading the tidal data of each area, as causing the tidal phenomena, and by adding the tidal data to the new moon day and the full moon day, as determined from the moon age value, to determine a tentative spring tide day, when this tentative spring tide day is the first day to appear on and after that calendar, so that it is possible to provide the program capable of accurately determining the spring tide day different between the areas.

What is claimed is:

1. An electronic tide meter for calculating a spring tide day, comprising: an input unit for inputting a calendar date selection and selecting a geographic area corresponding to a date and location of a desired calculated spring tide day; storing means for storing tidal data for each selectable geographic area; and operating means for calculating the positions of heavenly bodies dependent on the calendar date selection, for retrieving the tidal data depending on the selected geographic area from the storage means and for calculating the desired spring tide day by adding the calculated positions of the heavenly bodies to the retrieved tidal data.

2. An electronic tide meter according to claim 1; wherein the operating means includes means for calculating the positions of the heavenly bodies to determine the phase of the moon by calculating the number of days elapsed (TD) from Jan. 1, 2000 to the selected calendar date according to the following equation:

$$TD=\{int[365,2425*year]+int[3.59*(month-2)]+day-678912)+2400000.5\}-2451545.$$

3. An electronic tide meter according to claim 2; wherein the operating means includes means for calculating the number of days elapsed at noon (TD12) from Jan. 1, 2000 to the selected calendar date according to the following equation:

$$Td12=TD-(12-dt)/24$$

wherein dt is the time difference at the designated area from the world time.

4. An electronic tide meter according to claim 3; wherein the operating means includes means for calculating a time factor T representing the day number (TD12) of the designated date at noon in the Julian century value according to the following equation:

$$T=Td12/36525.$$

5. An electronic tide meter according to claim 4; wherein the operating means includes means for determining the longitudinal position of the moon (LM) according to the following equation:

$$LM=GO-(int[GO/360\}*360)$$

wherein $$GO=481267.8809*T+218.3162+6.2888*\cos\{(477198.868*T+44.693)*DR\}+$$

$$1.2740*\cos\{[413335.35*T+10.74)*DR\}+0.6583*\cos\{(890534.22*T+145.7)*DR\}+$$

$$0.2136*\cos\{(054397.74*T+179.93)*DR\}+0.1851*\cos\{(35999.05*T+87.53)*DR\};$$

and $$DR=3.141593/180.$$

6. An electronic tide meter according to claim 5; wherein the operating means includes means for determining the visual celestial longitude of the sun (LS) according to the following equation:

$$LS=G-(int[G/260]*360)$$

wherein $$G=36000.7695*T+280.4695+1.9147*\cos\{[35999.05*T+267.52)*DR\};$$

and $$DR=3.141593/180.$$

7. An electronic tide meter according to claim 6; wherein the operating means includes means for determining the moon age (AGE) according to the following equation:

$$AGE=29.5305*X/360$$

wherein X=LM−LS, and the value of 360 is added to X when it has a value less than 0.

8. An electronic tide meter for calculating a spring tide day, comprising: an input unit for inputting a calendar date selection and selecting a geographic area corresponding to a date and location from which to calculate a spring tide day; storing means for storing tidal data of selectable geographic areas; calculating means for calculating a new moon day and a full moon day dependent on the positions of heavenly bodies depending on the calendar date selection; and operating means for retrieving the tidal data by determining the selection of the area from the storing means and for calculating a spring tide day depending on the designated calendar date, the retrieved tidal data, and the calculated new moon day and full moon day.

9. A method for calculating a spring tide day, comprising the steps of:

storing tidal data for each of a plurality of geographic areas;

selecting a calendar date and a geographic area;

calculating the positions of heavenly bodies depending on the selected calendar date; and calculating a spring tide day by adding the calculated positions of the heavenly bodies to the stored tidal data for the selected geographic area.

10. A method for calculating a spring tide day, comprising the steps of:

storing tidal data corresponding to the tidal phenomena of at least one geographic area;

selecting a calendar date and one of the at least one geographic area;

calculating the positions of heavenly bodies depending on the selected calendar date to determine a new moon day and a full moon day; and calculating a spring tide day depending on the stored tidal data for the selected one of the at least one geographic area, the calculated new moon day and the calculated full moon day.

11. A computer algorithm for calculating a spring tide day depending on a designated calendar date, comprising the steps of:

storing tidal data for at least one geographic area;

selecting one of the at least one geographic area;

calculating positions of heavenly bodies depending on the designated calendar date; and calculating the spring tide day by adding the calculated positions of the heavenly bodies and the stored tidal data corresponding to the selected one of the at least one geographic area.

12. A computer algorithm for calculating a spring tide day depending on a designated calendar date, comprising the steps of:

storing tidal data for at least one geographic area;

selecting a designated calendar date and selecting one of the at least one geographic area corresponding to a date and location from which to calculate a spring tide day;

calculating the positions of heavenly bodies depending on the designated calendar date to determine a new moon day and a full moon day; and calculating the day, as appearing at first on and after the calendar, of those determined by adding the tidal data, as determined by the selection of the area, individually to the new moon day and the full moon day, as the spring tide day.

* * * * *